United States Patent
Kim et al.

(10) Patent No.: US 9,100,922 B2
(45) Date of Patent: Aug. 4, 2015

(54) METHOD AND TERMINAL APPARATUS FOR TRANSMITTING A POWER STATUS REPORT IN A WIRELESS COMMUNICATION SYSTEM

(75) Inventors: Dongcheol Kim, Gyeonggi-do (KR); Wookbong Lee, Gyeonggi-do (KR); Hangyu Cho, Gyeonggi-do (KR); Jinsoo Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 13/884,346

(22) PCT Filed: Nov. 9, 2011

(86) PCT No.: PCT/KR2011/008505
§ 371 (c)(1),
(2), (4) Date: May 9, 2013

(87) PCT Pub. No.: WO2012/064100
PCT Pub. Date: May 18, 2012

(65) Prior Publication Data
US 2013/0230010 A1    Sep. 5, 2013

Related U.S. Application Data

(60) Provisional application No. 61/411,483, filed on Nov. 9, 2010.

(51) Int. Cl.
*H04W 24/10*     (2009.01)
*H04W 52/04*     (2009.01)
(Continued)

(52) U.S. Cl.
CPC ............ *H04W 52/16* (2013.01); *H04W 52/146* (2013.01); *H04W 52/241* (2013.01); *H04W 24/10* (2013.01); *H04W 52/04* (2013.01); *H04W 52/18* (2013.01); *H04W 52/24* (2013.01)

(58) Field of Classification Search
USPC .......................................................... 370/329
See application file for complete search history.

(56) References Cited

U.S. PATENT DOCUMENTS

| 6,173,162 | B1 * | 1/2001 | Dahlman et al. ................. 455/69 |
| 2002/0075943 | A1 * | 6/2002 | Kurihara ....................... 375/146 |

(Continued)

FOREIGN PATENT DOCUMENTS

| KR | 10-2008-0056621 A | 6/2008 |
| KR | 10-2009-0113342 A | 10/2009 |

OTHER PUBLICATIONS

International Search Report issued in corresponding International Patent Application No. PCT/KR2011/008505 dated Jul. 31, 2012.

(Continued)

*Primary Examiner* — Jenee Williams
(74) *Attorney, Agent, or Firm* — Morgan, Lewis & Bockius LLP

(57) ABSTRACT

Method of transmitting a power status report by a mobile station in a wireless communication system according to the present application comprises receiving at least one of an offset value of a data channel or an offset value of a control channel for an uplink power control from a base station; determining a base uplink transmit power level for at least one of the data channel or control channel based on at least one of the received offset value of the data channel or the received offset value of the control channel; and transmitting the determined base uplink transmit power level to the base station.

11 Claims, 2 Drawing Sheets

(51) Int. Cl.
*H04W 52/14* (2009.01)
*H04W 52/16* (2009.01)
*H04W 52/18* (2009.01)
*H04W 52/24* (2009.01)

(56) References Cited

U.S. PATENT DOCUMENTS

| | | | |
|---|---|---|---|
| 2002/0082013 A1* | 6/2002 | Lee et al. | 455/522 |
| 2002/0115467 A1* | 8/2002 | Hamabe | 455/522 |
| 2002/0191582 A1 | 12/2002 | Miya et al. | |
| 2002/0196766 A1* | 12/2002 | Hwang et al. | 370/342 |
| 2003/0036403 A1* | 2/2003 | Shiu et al. | 455/522 |
| 2003/0039217 A1* | 2/2003 | Seo et al. | 370/318 |
| 2003/0232622 A1* | 12/2003 | Seo et al. | 455/437 |
| 2004/0106371 A1* | 6/2004 | Agin | 455/1 |
| 2004/0266469 A1* | 12/2004 | Hayashi et al. | 455/522 |
| 2005/0043051 A1* | 2/2005 | Takano et al. | 455/522 |
| 2005/0152279 A1* | 7/2005 | Robertson et al. | 370/252 |
| 2005/0159176 A1* | 7/2005 | Uehara et al. | 455/522 |
| 2005/0208961 A1* | 9/2005 | Willenegger | 455/522 |
| 2006/0146756 A1* | 7/2006 | Wang et al. | 370/335 |
| 2006/0209937 A1* | 9/2006 | Tanaka et al. | 375/219 |
| 2006/0281417 A1* | 12/2006 | Umesh et al. | 455/69 |
| 2006/0285515 A1* | 12/2006 | Julian et al. | 370/328 |
| 2006/0293076 A1* | 12/2006 | Julian et al. | 455/522 |
| 2007/0041429 A1* | 2/2007 | Khandekar | 375/146 |
| 2007/0066339 A1* | 3/2007 | Usuda et al. | 455/522 |
| 2007/0298799 A1* | 12/2007 | Molkdar et al. | 455/436 |
| 2008/0117833 A1* | 5/2008 | Borran et al. | 370/252 |
| 2008/0119215 A1* | 5/2008 | Ji et al. | 455/522 |
| 2008/0153425 A1 | 6/2008 | Heo et al. | |
| 2008/0161033 A1* | 7/2008 | Borran et al. | 455/522 |
| 2008/0220805 A1* | 9/2008 | Dayal et al. | 455/522 |
| 2008/0233995 A1 | 9/2008 | Shiu et al. | |
| 2009/0109912 A1* | 4/2009 | DiGirolamo et al. | 370/329 |
| 2009/0181714 A1* | 7/2009 | Yajima et al. | 455/522 |
| 2009/0196192 A1* | 8/2009 | Lim et al. | 370/252 |
| 2009/0247148 A1* | 10/2009 | Chen et al. | 455/422.1 |
| 2010/0091727 A1* | 4/2010 | Ishii | 370/329 |
| 2010/0118805 A1* | 5/2010 | Ishii et al. | 370/329 |
| 2010/0309877 A1* | 12/2010 | Damnjanovic et al. | 370/331 |

OTHER PUBLICATIONS

Written Opinion issued in corresponding International Patent Application No. PCT/KR2011/008505 dated Jul. 31, 2012.

* cited by examiner

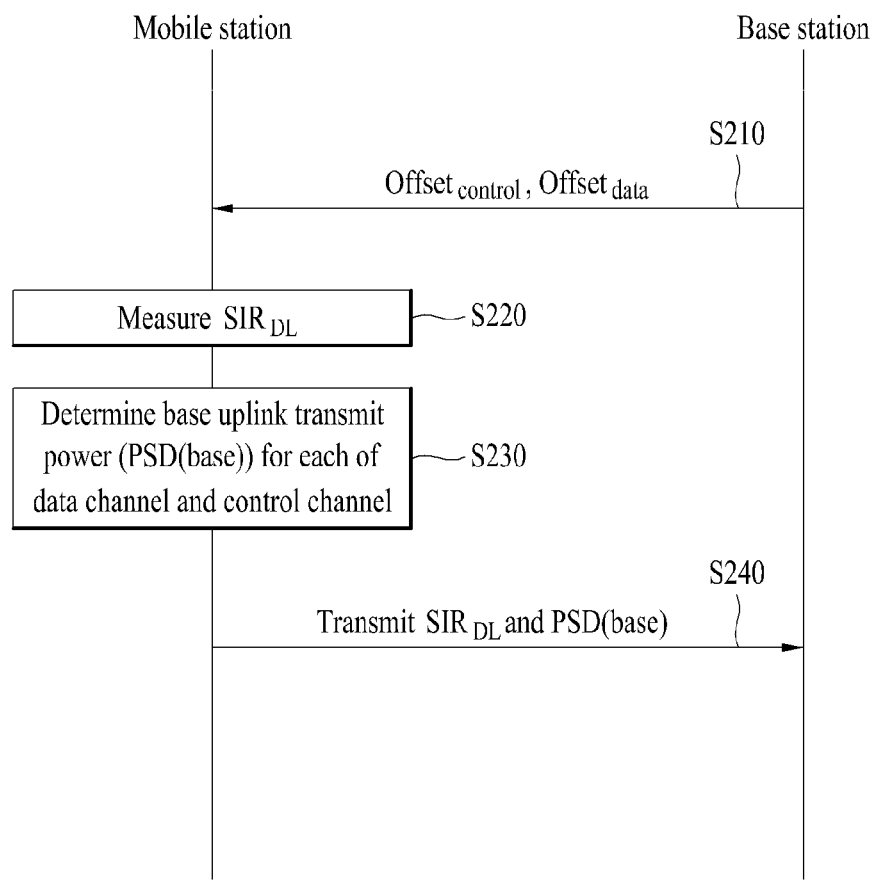

METHOD AND TERMINAL APPARATUS FOR TRANSMITTING A POWER STATUS REPORT IN A WIRELESS COMMUNICATION SYSTEM

TECHNICAL FIELD

The present invention relates to wireless communication and, more particularly, to a method of transmitting a power status report and a mobile station for performing such a method.

BACKGROUND ART

A next-generation multimedia wireless communication system, on which research has been actively carried out in recent years, requires various kinds of information, such as images and wireless data, to be processed at higher data transmission rate in addition to initial sound-based services.

In recent years, Orthogonal Frequency Division Multiplexing (OFDM) having a high data transmission rate has attracted considerable attention. OFDM is a multiple carrier modulation method that is capable of dividing a frequency band into a plurality of orthogonal subcarriers to transmit data, thereby reducing inter-symbol interference at low complexity.

It is necessary for orthogonality of a subcarrier to be maintained in a frequency level. Each orthogonal channel goes through mutually independent frequency selective fading and intervals between transmitted symbols are increased, thereby minimizing inter-symbol interference. Orthogonal Frequency Division Multiple Access (OFDMA) is a method of independently providing a portion of usable subcarriers to each user to realize multiple access in a system using OFDM as a modulation method. OFDMA provides frequency resources, such as subcarriers, to each user. The frequency resources may be independently provided to a plurality of users; therefore, the frequency resources may generally overlap each other. As a result, the frequency resources may be exclusively allocated per user. In an OFDMA system, frequency diversity for multiple users may be acquired through frequency selective scheduling and subcarriers may be allocated in various ways using a permutation method for the subcarriers.

In a few wireless communication systems, when a mobile station transmits an uplink signal to a base station, an uplink control channel to transmit a control signal and an uplink data channel to transmit data may be physically divided. In addition, a plurality of control/data channels may be simultaneously transmitted using one symbol. Transmit power of each uplink transmission channel may be determined through a specific equation.

The base station may receive a power status report (PSR) from the mobile station to perform the next scheduling of the mobile station. The recent wireless communication system adopts a carrier aggregation (multiple carriers) method and a fractional frequency reuse (FFR) method to improve communication performance. So far, however, a PSR reporting mode in the multiple carrier system and the system adopting the FFR method and a problem of exceeding the maximum power limit which may be generated during multiple transmission have not been concretely proposed.

DISCLOSURE

Technical Problem

An object of the present invention is to provide a method of transmitting a power status report by a mobile station in a wireless communication system.

Another object of the present invention is to provide a mobile station of transmitting a power status report in a wireless communication system.

The technical problems solved by the present invention are not limited to the above technical problems and those skilled in the art may understand other technical problems from the following description.

Technical Solution

In accordance with an aspect of the present invention, the above objects may be accomplished by the provision of a method of transmitting a power status report by a mobile station in a wireless communication system, the method including receiving at least one of an offset value of a data channel or an offset value of a control channel for an uplink power control from a base station, determining a base uplink transmit power level for at least one of the data channel or the control channel based on at least one of the received offset value of the data channel or the received offset value of the control channel, and transmitting the determined base uplink transmit power level to the base station. The method may further include calculating a downlink signal to interference power ratio value using a downlink signal received from the base station. The downlink signal to interference power ratio value calculated by the mobile station may be transmitted with the base uplink transmit power level. The determined base uplink transmit power level may be a value corresponding to each carrier. The calculated downlink signal to interference power ratio value may be measured per Fractional Frequency Reuse (FFR) partition index. The offset value of the data channel and the offset value of the control channel used to determine the base uplink transmit power level may be a value calculated by accumulating the offset value of the data channel and the offset value of the control channel received from the base station, respectively. Meanwhile, the value calculated by accumulating the offset value of the data channel and the offset value of the control channel may be an offset value accumulated when a power status report is triggered.

In accordance with another aspect of the present invention, the above objects may also be accomplished by the provision of a mobile station for transmitting a power status report in a wireless communication system, the mobile station comprising a receiver configured to receive at least one of an offset value of a data channel or an offset value per control channel for uplink power control from a base station, a processor configured to determine a base uplink transmit power level for at least one of the data channel or the control channel based on at least one of the received offset value of the data channel or the received offset value of the control channel, and a transmitter configured to transmit the determined base uplink transmit power level to the base station. The processor may calculate a downlink signal to interference power ratio value using a downlink signal received from the base station and the transmitter may transmit the downlink signal to interference power ratio value calculated by the processor with the base uplink transmit power level. The determined base uplink transmit power level may be a value corresponding to each carrier. The calculated downlink signal to interference power ratio value may be calculated per FFR partition index. The offset value of the data channel and the offset value of the control channel used to determine the base uplink transmit power level may be a value calculated by accumulating the offset value of the data channel and the offset value of the control channel received from the base station, respectively.

Advantageous Effects

According to various embodiments of the present invention, the excess of the maximum power limit which may be generated during multiple transmission is prevented and a base station efficiently perform the next scheduling of a mobile station, thereby considerably improving communication performance.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a view showing an example of a process of a mobile station transmitting a power status report (PSR) according to the present invention.

BEST MODE

Figure 1:
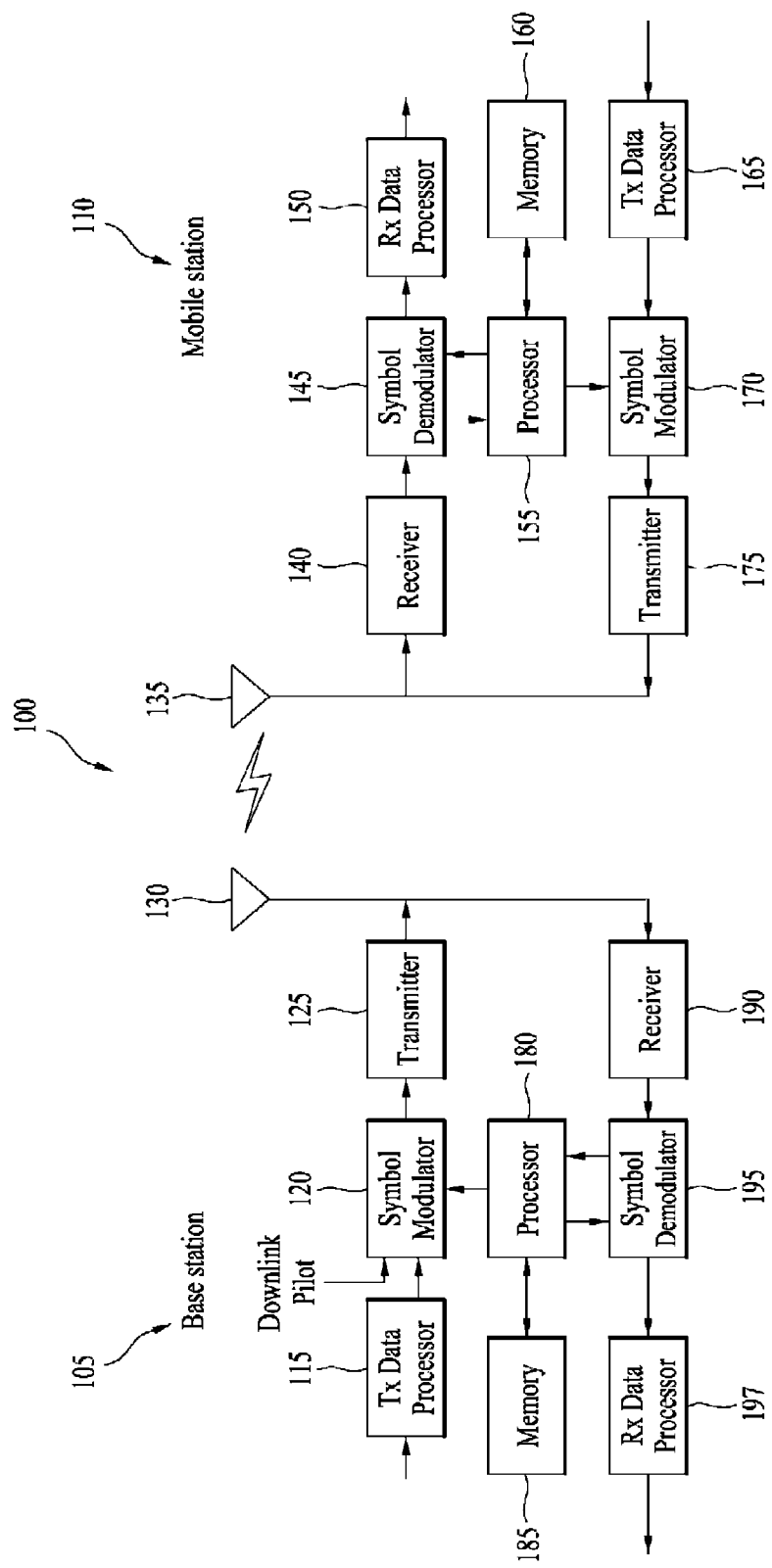
FIG. 1 is a block diagram showing configurations of a base station 105 and a mobile station 110 in a wireless communication system 100.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a 3rd Generation Partnership Project Long Term Evolution (3GPP LTE) system or a Long Term Evolution Advanced (LTE-A) system. However, the description is applicable to any other mobile communication system except for specific features inherent to 3GPP LTE and LTE-A.

In some instances, known structures and devices may be omitted or may be shown in block diagram form, focusing on important features of the structures and devices, so as not to obscure the concept of the invention. Meanwhile, the same reference numbers will be used throughout this specification to refer to the same or like parts.

In the following description, it is assumed that a mobile station generically refers to a mobile or fixed user end device, such as a User Equipment (UE), a Mobile Station (MS), or an Advanced Mobile Station (AMS). In addition, it is assumed that a base station generically refers to any node, such as a Node B, an evolved Node B (eNode B), a Base Station, or an Access Point (AP), at a network end which communicates with a mobile station. In this specification, a description will be given based on a 3GPP LTE system and an LTE-A system; however, details of the present invention are applicable to various other communication systems.

In a mobile communication system, a mobile station (or a user equipment) may receive information from a base station on downlink and transmit data to the base station on uplink. Information transmitted or received by the mobile station includes data and various types of control information. There are various physical channels depending on the types and usages of information transmitted or received by the mobile station.

FIG. 1 is a block diagram showing configurations of a base station 105 and a mobile station 110 in a wireless communication system 100.

While one base station 105 and one mobile station 110 are shown in order to simplify illustration of the wireless communication system 100, the wireless communication system 100 may include one or more base stations and/or one or more mobile stations.

Referring to FIG. 1, the base station 105 may include a transmission (Tx) data processor 115, a symbol modulator 120, a transmitter 125, a transmit/receive antenna 130, a processor 180, a memory 185, a receiver 190, a symbol demodulator 195, and a reception data processor 197. The mobile station 110 may include a transmission (Tx) data processor 165, a symbol modulator 170, a transmitter 175, a transmit/receive antenna 135, a processor 155, a memory 160, a receiver 140, a symbol demodulator 155, and a reception data processor 150. While FIG. 1 shows that the base station 105 includes one transmit/receive antenna 130 and the mobile station 110 includes one transmit/receive antenna 135, the base station 105 and the mobile station 110 respectively include a plurality of transmit/receive antennas. Accordingly, the base station 105 and the mobile station 110 according to the present invention support a Multiple Input Multiple Output (MIMO) system. In addition, the base station 105 according to the present invention may support both Single User-MIMO (SU-MIMO) and Multi-User-MIMO (MU-MIMO).

On downlink, the transmission data processor 115 receives traffic data, formats the received traffic data, codes the formatted traffic data, and interleaves and modulates (or symbol-maps) the coded traffic data to provide modulated symbols ("data symbols"). The symbol modulator 120 receives and processes the data symbols and pilot symbols to provide a symbol stream.

The symbol modulator 120 multiplexes the data symbols and the pilot symbols and transmits the multiplexed data and the multiplexed pilot symbols to the transmitter 125. Each transmitted symbol may be a data symbol, a pilot symbol, or a null signal value. In each symbol period, the pilot symbols may be consecutively transmitted. The pilot symbols may be Frequency Division Multiplex (FDM) symbols, Orthogonal Frequency Division Multiplex (OFDM) symbols, Time Division Multiplex (TDM) symbols, or Code Division Multiplex (CDM) symbols.

The transmitter 125 receives the symbol stream, converts the symbol stream into one or more analog signals, and additionally controls (for example, amplifies, filters, and frequency upconverts) the analog signals to generate a downlink signal suitable for transmission through a radio channel. Then, the transmit antenna 130 transmits the generated downlink signal to the mobile station.

In the configuration of the mobile station 110, the receive antenna 135 receives the downlink signal from the base station and provides the received downlink signal to the receiver 140. The receiver 140 adjusts (for example, filters, amplifies, and frequency downconverts) the received signal and digitizes the adjusted signal to acquire samples. The symbol demodulator 145 demodulates received pilot symbols and provides the demodulated pilot symbols to the processor 155 for channel estimation.

In addition, the symbol demodulator 145 receives a frequency response estimate value for downlink from the processor 155, demodulates the received data symbols to acquire data symbol estimate values (estimate values of the transmitted data symbols) and provides the data symbol estimate values to the reception data processor 150. The reception data processor 150 demodulates (i.e., symbol-demaps), deinterleaves, and decodes the data symbol estimate values to restore the transmitted traffic data.

Processing performed by the symbol demodulator 145 and the reception data processor 150 and processing performed by the symbol modulator 120 and the transmission data processor 115 of the base station 105 are complementary.

On uplink, the transmission data processor 165 of the mobile station 110 processes traffic data to provide data symbols. The symbol modulator 170 receives the data symbols, multiplexes the received data symbols, modulates the multiplexed data symbols, and provides a symbol stream to the transmitter 175. The transmitter 175 receives the symbol stream and processes the received symbol stream to generate an uplink signal. The transmit antenna 135 transmits the generated uplink signal to the base station 105.

In the base station 105, the uplink signal is received through the receive antenna 130 from the mobile station 110 and the receiver 190 processes the received uplink signal to acquire samples. Subsequently, the symbol demodulator 195 processes the samples to provide pilot symbols received for the uplink and data symbol estimate values. The reception data processor 197 processes the data symbol estimate values to restore the traffic data transmitted from the mobile station 110.

The processor 155 of the mobile station 110 and the process 180 of the base station 105 direct (for example, control, adjust, manage, etc.) operations of the mobile station 110 and the base station 105. The processors 155 and 180 may be respectively connected to the memories 160 and 185 that store program codes and data. The memories 160 and 185 are connected to the processor 180 to store operating systems, applications, and general files.

The processors 155 and 280 may also be referred to as controllers, microcontrollers, microprocessors, microcomputers, etc. Meanwhile, the processors 155 and 180 may be implemented by hardware, firmware, software, or combinations thereof. In a case in which the embodiments of the present invention are implemented using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) configured to implement the present invention may be included in the processors 155 and 180.

In a case in which the embodiments of the present invention are implemented using firmware or software, on the other hand, the firmware or the software may be configured to include a module, a procedure, or a function, which performs functions or operations of the present invention. Firmware or software configured to implement the present invention may be included in the processors 155 and 180 or stored in the memories 160 and 185 such that the firmware or the software is executed by the processors 155 and 180.

Layers of a wireless interface protocol between the mobile station and the base station and a wireless communication system (network) may be classified into a first layer L1, a second layer L2, and a third layer L3 on the basis of lower three layers of an Open System Interconnection (OSI) model well-known in the communication system. A physical layer belongs to the first layer and provides an information transmission service through a physical channel. A Radio Resource Control (RRC) layer belongs to the third layer and provides control radio resources between the mobile station and the network. The mobile station and the base station may exchange RRC messages through a wireless communication network and the RRC layer.

A description will be given of a method of a mobile station determining uplink transmit power using Equation 1 in an Institute of Electrical and Electronics Engineers (IEEE) 802.16m system, which is an example of a mobile communication system. Generally, it is necessary for the mobile station to determine an uplink transmit power value when transmitting an uplink signal.

$$P(dBm)=L+SINR_{Target}NI+Offset \quad \text{Equation 1}$$

Where P indicates a transmit power level (dBm) for each subcarrier and stream for current transmission and L indicates a current average downlink propagation loss estimated by the mobile station. L includes a transmit antenna gain and path loss of the mobile station. $SINR_{Target}$ is a target uplink Signal to Inteference plus Nose Ratio (SINR) value received from the base station. NI is an average noise and interference level (dBm) per subcarrier estimated by the base station and is received by the mobile station from the base station. Offset is a correction term for power offset per mobile station. An offset value is transmitted from the base station through a power control message. There are two offset values, such as Offsetdata, which is used for data transmission, and Offsetcontrol, which is used for control information transmission.

In the case of a control channel on which control information is transmitted, the mobile station may directly apply a target Signal to Inteference plus Nose Ratio (SINR) value corresponding to the control channel to Equation 1 using Table 1, which is previously defined.

TABLE 1

| Control channel type | $SINR_{Target}$ parameters |
|---|---|
| HARQ Feedback | targetHarqSinr |
| Synchronized Ranging | targetSyncRangingSinr |
| P-FBCH | targetPfbchSinr |
| S-FBCH | targetSfbchBaseSinr |
|  | targetSfbchDeltaSinr |
| Bandwidth Request | targetBwRequestSinr |

In a case in which the mobile station transmits data, however, it is necessary to set the target SINR value using Equation 2.

$$SINR_{Target} = \quad \text{Equation 1}$$
$$10\log10\left(\max\left(10^{\wedge}\left(\frac{SINR_{MIN}(dB)}{10}\right), \gamma_{IoT} \times SIR_{DL} - \alpha\right)\right) -$$
$$\beta \times 10\log10(TNS)$$

Where $SINR_{MIN}(dB)$ is a minimum SINR value required for the base station and is set through a unicast power control message. $SINR_{MIN}$ is represented by 4 bits and may have one selected from among values {−∞, −3, −2.5, −1, 0, 0.5, 1, 1.5, 2, 2.5, 3, 3.5, 4, 4.5}. $SIR_{DL}$ indicates a downlink signal to interference power ratio measured by the mobile station.

$\gamma IoT$ is a fairness and IoT control factor and is broadcast by the base station to the mobile station. Alpha(α) is a factor based on the number of receive antennas in the base station and is signaled as 3 bits through MAC power control mode signaling. In this case, Alpha(α) may be represented as {1, ½, ¼, ⅛, 1/16, 0}, for example. Beta(β) may be set to 0 or 1 through 1-bit MAC power control mode signaling.

TNS is the total number of streams in a Logical Resource Unit (LRU) indicated by a UL-A-MAP IE. In the case of Single User-MIMO (SU-MIMO), TNS is set to Mt, which is the number of streams per user. CSM is set to TNS and is the total number of streams. In the case of control channel transmission, CSM may be set to 1.

The mobile station has two key parameters to transmit a power status report. The two key parameters are base uplink transmission PSD and $SIR_{DL}$. The base uplink transmission PSD may be derived by setting the SINRtarget value and the offset value to 0 in Equation 1. The base uplink transmission PSD may be represented by Equation 2.

$$PSD(base) = L + NI \quad \text{Equation 3}$$

Where, the PSD parameter is reported at dBm level and is encoded using 8 bits with 0.5 dBm step within a range between −74 dBm (coded to 0x00) and 53.5 dBm (coded to 0xFF). The NI value used in Equation 3 is the latest NI value of a frequency partition provided together with an uplink control channel. The $SIR_{DL}$ value measured by the mobile station is coded using 10 bits with 1/16 dB step within a range between −12 dB (coded to 0x000) and 51 15/16 dB (coded to 0x3ff). When the base station receives PSD and $SIR_{DL}$ from the mobile station, the processor 180 of the base station may estimate PSD for all uplink channels.

In a case in which Equation 4 is satisfied, event triggering may be performed and it is necessary for the mobile station to transmit an uplink power status report message to the base station through an uplink power status report header.

$$|M(n_{last}) - M(n)| \geq \text{txPowerReportThreshold}$$

and $$n - n_{last} \geq \text{txPowerReportMiniumInterval}$$

or $$n - m_{last} \geq \text{txPowerReportPeriodicalInterval} \quad \text{Equation 4}$$

Where M may be represented by Equation 5.

$$M = L + SINR_{Target} \quad \text{Equation 5}$$

Where L indicates a transmit antenna gain and path loss of the mobile station represented by Equation 1. $SINR_{Target}$ is a value when β is 0 in Equation 2 and is a value measured just as a power status has been reported. $n_{last}$ indicates a frame index when the last mobile station status report message is transmitted and n indicates a current frame index. In addition, the base station transmits the following status report configuration parameters to the mobile station through an AAI-UL-PSR-CFG message: txPowerReportThreshold, txPowerReportMinimumInterval, and txPowerReportPeriodicalInterval.

Upon receiving a first AAI-UL-PSR-CFG message, in which an uplinkPowerStateReport parameter is set to 1, the mobile station should transmit a first power status report. Table 2 indicates uplink status report messages in an IEEE 802.16m system, which is an example of a mobile communication system. Table 2 explains the status report configuration parameters, such as txPowerReportThreshold, txPowerReportMinimumInterval, and txPowerReportPeriodicalInterval, of Equation 4.

TABLE 2

| Field | Size9 bits) | Value/Description | Condition |
|---|---|---|---|
| UplinkPowerStatusReport | 1 | Disable(0), enable(1) | N/A |
| If(uplinkPowerStatusReport=0b1 ){ | 4 | | |
| txPowerReportThreshold | 4 | txPowerReportThreshold is a 4-bit unsigned integer value in 0.5 dB steps, the specific value "0b1111" shall be interpreted as "infinite" | Present when uplink-PowerStatusReport is enabled |
| txPowerReportMinimumInterval | 4 | txPowerReportMinimumInterval is coded by 4-bit unsigned integer values d representing 2d frames, the specific value d = 0b1111 shall be interpreted as "infinite" | |
| txPowerReportPeriodicalInterval | 4 | txPowerReportPeriodicalInterval is coded by 4-bit unsigned integer values d representing 2d frames, the specific value d = 0b1111 shall be interpreted as "infinite" | |
| } | | | |
| If(Carrier-Specific PHY control mode=0b0){ | 6 | The relevant active carrier that this control message is associated with | Present if the Carrier specific PHY control mode is disabled |
| } | | | |

Referring to Table 2, the mobile station may inform the base station of the txPowerReportThreshold value of the AAI-UL-PSR-CFG message indicated in Table 2 when the uplink power status report (UplinkPowerStatusReport) is enabled.

Table 3 indicates an uplink power status report header used to carry the uplink power control status information of the mobile station.

TABLE 3

| Syntax | Size (bits) | Notes |
|---|---|---|
| Uplink Power Status Report Header( ) { | | |
| FID | 4 | Flow Identifier. Set to 0010. |
| Type | 5 | MAC signaling header type = 0b00101 |
| Length | 3 | Indicates the length of the signaling header in bytes: 0b110: 6 bytes |
| ULPC Parameters Updating Indicator | 1 | Indicates whether the AMS has updated its ULPC parameters from AAI-SCD: 0: No ULPC parameters have changed. 1: The confirmation of new ULPC parameters from AAI-SCD applied. |
| Configuration Change Count | 4 | Only valid if ULPC Parameters Updating Indicator == 0b1. The value is the same as "Configuration Change Count" in the latest AAI-SCD message. |
| txPowerPsdBase | 8 | txPowerPsdBase (PSD(base)) is coded using 8 bits in 0.5 dBm steps ranging from −74 dBm (coded 0x00) to 53.5 dBm (coded 0xFF). |
| txSirDownlink | 10 | txSirDownlink ($SIR_{DL}$) is coded using 10 bits in $1/16$ dB steps ranging from −12 dB (coded 0x000) to 51.9375 dB (coded 0x3ff). |
| Physical Carrier Index | 6 | The relevant active carrier with which this signaling header is associated. The value shall be set to 0b111111 if AMS has not received AAI-Global-CFG message or AAI-MC-ADV message yet. |
| Reserved | 7 | Shall be filled by 0 for byte alignment. |
| } | | |

TABLE 4

| Priority | Channel Type |
|---|---|
| 1 | HARQ feedback |
| 2 | PFBCH/SFBCH |
| 3 | Synchronized Ranging |
| 4 | Sounding |
| 5 | DATA |
| 6 | Bandwidth Request |

Table 3 indicates an uplink power status report header format for the mobile station to transmit an uplink power status report. The uplink power status report header format may include a flow identifier, type of a MAC signaling header, length of the signaling header, an indicator indicating whether an uplink power control (ULPC) parameter has been updated, configuration change count, txPowerPsdBase, txSirDownlink, and a physical carrier index related to the signaling header (indicating a carrier index related to the signaling header in a multiple carrier system).

Current transmission of an uplink control channel and an uplink data channel will hereinafter be described. In a case in which control channels are simultaneously transmitted, uplink transmit power is allocated in order of control channels based on priority of Table 4 until the uplink transmit power reaches total transmit power corresponding to the maximum power limit of the mobile station. In a case in which the mobile station has not sufficient power to transmit the allocated channels, the mobile station may transmit the channels based on priority using remaining power even when the power level determined by Equation 1 is not satisfied. Table 4 indicates power allocation priority between channels.

Referring to Table 4, transmission channel types may be generally classified into a data channel for data transmission and a control channel for control information transmission. Uplink data may be retransmitted using link adaptation or Hybrid Automatic Repeat reQuest (HARQ). On the other hand, HARQ is not performed for an uplink control signal; therefore, the uplink control signal may generally not be retransmitted. Consequently, it is necessary for the control channel to have priority over the data channel.

On the other hand, bandwidth request may be performed using various methods; therefore, the bandwidth request may be retransmitted. The mobile station which has not received an ACKnowledgement (ACK) signal of bandwidth request from the base station may, for example, perform bandwidth request based on Random Access, use a bandwidth request signaling header, perform piggybacked bandwidth request, or perform bandwidth request using a high speed feedback channel. The random access bandwidth request is performed through a bandwidth request channel when a feedback signal is not transmitted and a data signal is not transmitted. Upon receiving acknowledgement of the bandwidth request header from the base station, the bandwidth request signaling header may be transmitted to the base station as a response thereto. The piggybacked bandwidth request is a method of transmitting the bandwidth request together with data in a case in which the data are present when the bandwidth request is transmitted. In a case in which a high speed feedback signal to be transmitted is present when the bandwidth request is transmitted, the mobile station may transmit the bandwidth request to the base station through a primary high speed feedback channel (PFBCH). Consequently, the bandwidth request channel in Table 4 is generally a kind of control channel; however, the bandwidth request channel has the lowest priority since the bandwidth request channel may be retransmitted using various methods.

Referring to Table 4, an HARQ feedback channel, which is a channel to transmit an Acknowledgement (ACK)/Non-acknowledgement (NACK) signal, which is a response of the base station to data transmission, is a requisite channel to perform an HARQ operation to decrease demand of retransmission from the mobile station to the base station, thereby improving transmission efficiency of packet data. Consequently, the HARQ feedback channel has the highest priority.

A PFBCH/SFBCH channel is a channel used to transmit a Channel Quality Indicator (CQI), a Space Timing Coding (STC) speed indicator, a Precoding Matrix Index (PMI), etc. The PFBCH/SFBCH channel participates in downlink scheduling, downlink user selection, and resource allocation. For this reason, the PFBCH/SFBCH channel may have a priority following the HARQ feedback channel.

In a case in which uplink synchronization is not achieved, on the other hand, the base station may not recognize the mobile station with the result that the base station may not properly perform resource allocation and subsequent communication. Since it is necessary for the mobile station synchronized with a specific base station to periodically transmit a ranging signal such that tracking to maintain the synchronization is performed, a ranging channel necessary to continuously maintain synchronization between the mobile station and the base station has high priority.

A sounding reference signal (or a sounding signal) is a signal transmitted in a synchronized state. The base station estimates an uplink channel status based on the sounding reference signal received from the mobile station and performs scheduling (for example, user selection, resource allocation, etc.) according to the estimated channel status. In order for the mobile station to stably transmit the sounding reference signal to the base station, it is necessary to maintain synchronization between the mobile station and the base station. For this reason, a sounding channel, through which the sounding reference signal is transmitted, may have lower priority than a synchronized ranging channel.

Data may be retransmitted even when transmission of the data fails. For this reason, the data may have lower priority than the HARQ feedback channel, the PFBCH/SFBCH channel, the synchronized ranging channel, and the sounding channel.

Meanwhile, when the mobile station transmits PSD(base) and $SIR_{DL}$ calculated as represented by Equation 3 to the base station, the base station may estimate an expected transmit power level for the data channels and the control channels. In this case, it is meant that the offset value should be operated as an absolute value. When the offset is operated as an accumulated value, however, it is difficult for the base station to estimate transmit power of the current mobile station due to the current offset element. The difference between TPC command values transmitted from the base station to the mobile station and the value actually applied by the mobile station may be generated due to a reception error of the transmit power control command or for various reasons.

Furthermore, since the control channel(s) and the data channel may be transmitted in the same time and/or resource section, reporting information of the mobile station is necessary. Transmit power of the data channel during simultaneous allocation/transmission is determined as remaining power after power allocation to the control channel; therefore, power information regarding the control channel considering even the accumulated TPC command value is important. Consequently, the above-mentioned power status report is difficult for the base station to sufficiently recognize the current power status of the mobile station.

In addition, in a system using downlink/uplink multiple carriers, it is necessary to perform a power status report in terms of total power of the mobile station. Furthermore, the power status report should be helpful when the base station perform resource allocation for the next transmission. As previously described, however, a method of supporting it has not been proposed. In addition, a concrete method for simultaneous transmission of the mobile station in terms of total power has not been proposed.

To this end, the present invention proposes a method of the mobile station transmitting $SIR_{DL}$ while dividing PSD(base) into the data channel and the control channel and transmitting PSD calculated by applying offset values per data channel and control channel as represented by Equation 6 and Equation 7 to the base station.

$$PSD(base) = L + NI + Offset_{control} \quad \text{Equation 6}$$

$$PSD(base) = L + NI + Offset_{Data} \quad \text{Equation 7}$$

In Equation 6 and Equation 7, any one selected from among dBm, dB, and a linear value may be used as a unit (or level). As can be seen from Equation 6 and Equation 7, it is necessary to transmit PSD(base) while dividing PSD(base) into the data channel and the control channel in a case in which the offset value of Equation 1 is operated as an accumulated value. When an event is generated, the control channel or the data channel may not be allocated. At this time, an accumulated TPC command value which has been recently updated of the mobile station may be used. In this connection, in a case in which the data channel of the control channel is allocated when a power status report (PSR) event is generated, the processor 155 of the mobile station may apply the offset value when PSR is generated to calculate PSD. A case in which even one of the two is operated in an accumulated mode (that is, a mode to cumulatively operate the TPC command value) is included. Otherwise, in a case in which both the two are operated in an absolute mode, calculation may be performed using an absolute value instead of the accumulated value like the offset value of Equation 1.

In a case in which the power status report (PSR) includes a combination of PSD(base) values, in which different offset values are applied to the data channel and the control channel, and $SIR_{DL}$, the mobile station may report the $SIR_{DL}$ value together with PSD of Equation 6 or Equation 7. Alternatively, the mobile station may simultaneously report the $SIR_{DL}$ value together with PSD of Equation 6 and Equation 7. That is, the mobile station may combine Equation 6 and Equation 7 and the $SIR_{DL}$ value to configure information and transmit the configured information to the base station. For example, the mobile station may combine Equation 6 and the $SIR_{DL}$ value to configure information. Alternatively, the mobile station may combine Equation 7 and the $SIR_{DL}$ value to configure information.

In another embodiment, the mobile station may configure and transmit PSD(base) as represented by Equation 8 and Equation 9 at the time of reporting PSR.

$$PSD(base) = L + NI + SINR_{target} + Offset_{control} \quad \text{Equation 8}$$

$$PSD(base) = L + NI + SINR_{target} + Offset_{Data} \quad \text{Equation 9}$$

In Equation 8 and Equation 9, what are calculated and/or signaled at the data channel and the control channel are used as SINR$_{target}$ values. In this case, PSD may be defined as any channel in a case in which a multiple data/control channel is transmitted. Particularly for the control channel, the SINR$_{target}$ values are different from each other per channel. As an example, therefore, PSD may be defined and used based on the HARQ feedback channel. Of course, a PSD level may be calculated based on channels other than the HARQ feedback channel. For the data channel, a value calculated by Equation 1 may be used. In a case in which β of SINR$_{target}$ is always set to 0, it is possible for the base station to determine an actual PSD level of the mobile station. Of course, any value applied as needed may be used as the β value.

FIG. 2 is a view showing an example of a process of a mobile station transmitting a power status report (PSR) according to the present invention.

Referring to FIG. 2, as previously described, the mobile station may receive an offset value (offset$_{data}$) of a data channel to calculate a PSD(base) value from the base station through an AAI-UL-POWER-ADJ message and may receive an offset value (offset$_{control}$) per control channel from the base station through a PC-A-MAP IE (S210). The mobile station cumulatively receives offset$_{control}$ and offset$_{data}$ from the base station. The mobile station cumulatively calculates these value until a PSR event is generated. In a case in which the PSR event has been generated, the processor 155 of the mobile station may measure SIR$_{DL}$, which is a downlink signal to interference ratio, using a downlink signal from the base station (S220). Subsequently, the mobile station may calculate PSD(base) per control channel and for the data channel using offset$_{control}$ and offset$_{data}$ cumulatively received from the base station (S230). Subsequently, the mobile station may transmit the measured SIR$_{DL}$ value and the calculated PSD(base) (PSD(base) corresponding to the data channel and/or the control channel) to the base station (S240). As previously described, PSD(base) and SIR$_{DL}$ may be combined in various manners to configure information, which may be transmitted to the base station. In FIG. 2, step S210 to step S230 are sequentially displayed; however, the sequence of the steps may be changed.

In a case in which the wireless communication system adopts Fractional Frequency Reuse (FFR), on the other hand, the mobile station may report the SIR$_{DL}$ value per FFR partition to the base station. This is because SIR$_{DL}$ may have different statistical characteristic values per Frequency Partition (FP). Consequently, more elaborate interference level control may be performed through reporting considering the FFR partition. In the wireless communication system adopting the FFR mode, therefore, the SIR$_{DL}$ value, which the mobile station reports to the base station, may be expressed as SIR$_{DL}$(i), where i indicates an FP index. Of course, as previously described, the SIR$_{DL}$ value may have different statistical characteristics depending upon a downlink FFR pattern (DL FFR pattern). In a case in which the downlink FFR pattern and an uplink FFR pattern (UL FFR pattern) are the same, SIR$_{DL}$ reporting per FP is necessary. In a case in which the downlink FFR pattern and an uplink FFR pattern (UL FFR pattern) are different from each other, on the other hand, an average SIR$_{DL}$ value may be applied.

In addition, in a case in which the wireless communication system adopts Multiple UL component carriers, Equation 6 and Equation 7 may be expressed as Equation 11 and Equation 12 and the SIR$_{DL}$ value may also be expressed as SIR$_{DL,C}$ in consideration of component carriers (which may also be referred to as multiple carriers or serving cells). The processor 155 of the mobile station may independently calculate PSD(base) per component carrier.

$$PSD(\text{base})_C = L_C + NI_C + \text{Offset}_{control, C} \qquad \text{Equation 10}$$

$$PSD(\text{base})_C = L_C + NI_C + \text{Offset}_{Data, C} \qquad \text{Equation 11}$$

Where C indicates a component carrier index and parameter values are the same as what are defined in Equation 6 and Equation 7. That is, each parameter is a value calculated per component carrier. In a case in which the SIR$_{DL}$ value and TNS are activated, the SINR$_{Target}$ value of M expressed in Equation 5 is greatly influenced by the two values. A threshold value of M is signaled by the base station in 0.5 dB steps. However, much more uplink signaling may be generated by change of the SIR$_{DL}$ value and TNS rather than change of the L value. L and SIR$_{DL}$, which have the greatest influence, are important in estimating transmit power of the mobile station necessary for the next transmission.

According to the present invention, therefore, the M value may be configured as a function f(L, SIR$_{DL}$) using the L and SIR$_{DL}$ values. The following configuration may be considered: it may be defined that M=L+SIR$_{DL}$, that M=L+SINR-target when β=0, that M=L, or that M=SIR$_{DL}$. Alternatively, M may be configured using various combinations of the above equations. In this case, an event may be generated with respect to one of the two critical values for M and may be reported.

In a case in which the IEEE 802.16m system is extended to the multiple uplink component carriers, Equation 1 and Equation 2 may be changed to Equation 12 and Equation 13 through extension as represented by Equation 10 and Equation 11. Basically, independent power control is performed per uplink component carrier.

$$P_C = NI_C + L_C + SINR_{Target,C} + \text{offset}_C \qquad \text{Equation 12}$$

$$SINR_{Target,C} = 10 * \log_{10} \qquad \text{Equation 13}$$
$$\left(\max\left(10 \wedge \left(\frac{SINR_{MIN,C}(\text{dB})}{10}\right), \gamma_{IoT,C} * SIR_{DL,C} - \alpha_C\right)\right) -$$
$$\beta_C * 10 * \log_{10}(TNS_C)$$

Where C is a component carrier index and the other parameters are the same as the ones used in Equation 1 and Equation 2 except that only the component carrier index is added.

In an equation of PSD(base)=L+NI, the NI value is a value which the base station broadcasts to the mobile station. The NI message does not have a time index like an AAI-SCD message. For this reason, the mobile station and the base station do not know that the mobile station uses an NI value of what time point. The NI value may be operated in dB with L to decrease an information amount of PSD(base). If the base station does not estimate that an NI value of what time point has been used, however, an estimate accuracy of the PSD (base) value is lowered, which causes incorrect scheduling of the mobile station.

The mobile station may not receive the NI message. Consequently, time index information (for example, information, such as a frame index or change counter of the AAI-SCD message, regarding the time point when the NI value has been transmitted) may be transmitted together with PSR. Alternatively, a predetermined basic set value (in dB or a liner scale) may be used since the NI value is a value used to simply the information amount, thus having no significant meaning. This value is previously known by the mobile station and the base station and may be informed when the mobile station is informed of system information (at the time of network entry/reentry). Alternatively, the value may be fixed and used by the mobile station and the base station. This has an advantage in that additional signaling is not necessary. Alternatively, a single value or a set of various values may be configured and used.

In the system using the multiple carriers, the mobile station may simultaneously transmit the power status report (PSR) per carrier on the configured/activated/scheduled uplink carrier to the base station. The base station performs resource allocation of the mobile station for the next transmission based on the reported PSR information.

For example, in a case in which the number of activated component carriers is 2 and the number of component carriers having resources allocated thereto is 2, the mobile station should simultaneously transmit information regarding the three component carriers to the base station when PSR trigging is generated. To this end, a status transmission condition for PSR should be set per mobile station. The base station informs the mobile station of reference downlink/uplink carriers for the M value or predetermined values are used.

In Table 2, a portion corresponding to the Carrier-Specific PHY control mode may be omitted from the AAI-UL-PSR-CFG message. As long as only one PSR-CFG for the uplink carriers is configured and equally applied or a triggering condition is set for only one of the reference downlink/uplink carriers, the portion corresponding to the Carrier-Specific PHY control mode may be omitted.

According to the present invention, PSR reporting may be performed using Table 5, in which a portion of Table 2 is changed.

TABLE 5

| Syntax | Size (bits) | Notes |
| --- | --- | --- |
| Uplink Power Status Report Header( ) { | | |
| FID | 4 | Flow Identifier. Set to 0010. |
| Type | 5 | MAC signaling header type = 0b00101 |
| Length | xx | Indicates the length of the signaling header in bytes: |
| For(i= 0; i<Nc; i++){ | | Nc: total number of configured/activated/scheduled CCs or Serving BS Carriers |
| ULPC Parameters Updating Indicator | 1 | Indicates whether the AMS has updated its ULPC parameters from AAI-SCD: 0: No ULPC parameters have changed. 1: The confirmation of new ULPC parameters from AAI-SCD applied. |
| Configuration Change Count | 4 | Only valid if ULPC Parameters Updating Indicator == 0b1. The value is the same as "Configuration Change Count" in the latest AAI-SCD message. |
| txPowerPsdBase | 8 | txPowerPsdBase (PSD(base)) is coded using 8-bits in 0.5 dBm steps ranging from −74 dBm (coded 0x00) to 53.5 dBm (coded 0xFF) |
| txSirDownlink | 10 | txSirDownlink (SIRDL) is coded using 10-bits in 1/16 dB steps ranging from −12 dB (coded 0x000) to 51.9375 dB (coded 0x3ff). |
| } Reserved bits } | | |

Table 5 indicates an uplink PSR header formant including all information regarding several carriers. In this case, therefore, an information amount is smaller than a case in which simultaneous transmission is performed per component carrier and transmission is efficiently performed by a single uplink component carrier. In addition, the mobile station may also transmit the maximum power level per uplink carrier when PSR is transmitted. This may be helpful for the base station to recognize the total power of the mobile station.

In the system using the downlink/uplink multiple carriers, the mobile station may perform multiple transmission. However, the sum of transmit power for allocated resources may exceed the limited total power of the mobile station. In this case, the mobile station may allocate power based on predetermined priority of transmission channels. In a case in which multiple transmission is performed through multiple carriers, the following method may be used.

First, power may be allocated to each carrier based on priority and then total power limitation may be applied to reconfigure overall sequence based on ordering for each carrier. The sum may be controlled not to exceed total power that can be transmitted. If the total power of the mobile terminal is exceeded, in a case in which the same channel is present in the respective carriers, a primary carrier may have priority over the other carriers and the same weight may be applied to the other carriers excluding the primary carrier to perform power scaling.

Alternatively, priority of all allocated channels (that is, channels to be transmitted) of the mobile station may be previously defined and, in a case in which same channel is present in several uplink components, 1) a primary carrier may have priority over the other carriers and the same weight may be applied to the other carriers excluding the primary carrier to perform power scaling, 2) the same weight may be applied to all of the carriers, or 3) a predetermined weight may be applied per carrier to perform power scaling.

According to various embodiments of the PSR reporting method of the present invention as described above, it is possible for the base station to accurately estimate the power of the mobile station and to more elaborately perform resource allocation and transmit power control of the mobile station. In addition, it is possible for the base station to accurately estimate the power of the mobile station even in the system adopting the multiple carriers and FFR methods.

The embodiments of the present invention as described above are specific combinations of elements and features of the present invention. The elements or features may be considered selective unless otherwise mentioned. Each element or feature may be practiced without being combined with other elements or features. In addition, embodiments of the present invention may be constructed by combining some of the elements and/or features. Operation orders described in embodiments of the present invention may be changed. Some constructions or features of any one embodiment may be included in another embodiment or may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method of transmitting a power status report by a mobile station in a wireless communication system, the method comprising:
    receiving an offset value of a data channel and an offset value of a control channel for an uplink power control from a base station;
    determining a base uplink transmit power level for the data channel and control channel based on the received offset value of the data channel and the received offset value of the control channel, respectively; and
    transmitting the determined base uplink transmit power level to the base station, wherein power control is performed by the base station for a next transmission based on the determined base uplink transmit power control level,
    wherein the offset value of the data channel or the offset value of the control channel used to determine the base uplink transmit power level is a value calculated by accumulating offset values of the data channel or offset values of the control channel, respectively.

2. The method according to claim 1, further comprising calculating a downlink signal to interference power ratio value using a downlink signal received from the base station.

3. The method according to claim 2, wherein the downlink signal to interference power ratio value calculated by the mobile station is transmitted with the base uplink transmit power level.

4. The method according to claim 2, wherein the calculated downlink signal to interference power ratio value is calculated per Fractional Frequency Reuse (FFR) partition index.

5. The method according to claim 1, wherein the determined base uplink transmit power level is a value corresponding to each carrier.

6. The method according to claim 1, wherein the base uplink transmit power level for the data channel and the base uplink transmit power level for the control channel are determined by Equation A and Equation B, respectively.

$$PSD(\text{base}) = L + NI + \text{Offset}_{Data} \quad \text{[Equation A]}$$

$$PSD(\text{base}) = L + NI + \text{Offset}_{control} \quad \text{[Equation B]}$$

where L is a current average downlink propagation loss estimated by the mobile station, NI is an average noise and interference level per subcarrier estimated by the base station, and OffsetData and Offsetcontrol are values to correct power offsets of the data channel and the control channel, respectively.

7. A mobile station for transmitting a power status report in a wireless communication system, the mobile station comprising:
    a receiver configured to receive at least one of an offset value of a data channel and an offset value of a control channel for an uplink power control from a base station;
    a processor configured to determine a base uplink transmit power level the data channel and the control channel based on the received offset value of the data channel and the received offset value of the control channel, respectively; and
    a transmitter configured to transmit the determined base uplink transmit power level to the base station, wherein power control is performed by the base station for a next transmission based on the determined base uplink transmit power control level,
    wherein the offset value of the data channel or the offset value of the control channel used to determine the base uplink transmit power level is a value calculated by accumulating offset values of the data channel or offset values of the control channel, respectively.

8. The mobile station according to claim 7, wherein:
    the processor is further configured to calculate a downlink signal to interference power ratio value using a downlink signal received from the base station; and
    the transmitter is further configured to transmit the downlink signal to interference power ratio value calculated by the processor with the base uplink transmit power level.

9. The mobile station according to claim 8, wherein the calculated downlink signal to interference power ratio value is calculated per FFR partition index.

10. The mobile station according to claim 7, wherein the determined base uplink transmit power level is a value corresponding to each carrier.

11. The mobile station according to claim 7, wherein the processor is configured to determine the base uplink transmit power level for the data channel and the base uplink transmit power level for the control channel using Equation C and Equation D, respectively.

$$PSD(\text{base}) = L + NI + \text{Offset}_{Data} \quad \text{[Equation C]}$$

$$PSD(\text{base}) = L + NI + \text{Offset}_{control} \quad \text{[Equation D]}$$

where L is a current average downlink propagation loss estimated by the mobile station, NI is an average noise and interference level per subcarrier estimated by the base station, and OffsetData and Offsetcontrol are values to correct power offsets of the data channel and the control channel, respectively.

* * * * *